United States Patent [19]

Keizer

[11] 4,375,095
[45] Feb. 22, 1983

[54] METHOD AND APPARATUS FOR TESTING STYLI

[75] Inventor: Eugene O. Keizer, Princeton, N.J.

[73] Assignee: RCA Corporation, New York, N.Y.

[21] Appl. No.: 222,546

[22] Filed: Jan. 5, 1981

[51] Int. Cl.³ .......................... H04N 5/76; G11B 3/38
[52] U.S. Cl. ........................................ 369/55; 369/53; 369/71; 369/276; 369/277
[58] Field of Search .................. 369/55, 56, 276, 277, 369/53, 71

[56] References Cited

U.S. PATENT DOCUMENTS

| | | | |
|---|---|---|---|
| 3,460,841 | 8/1969 | Caldwell | 369/53 |
| 3,842,194 | 10/1974 | Clemens | 358/128 |
| 3,842,217 | 10/1974 | Clemens | 358/128 |
| 3,909,517 | 9/1975 | Clemens | 358/128 |
| 4,030,123 | 6/1977 | Taylor et al. | 358/128 |
| 4,030,124 | 6/1977 | Allen | 358/128 |
| 4,037,253 | 7/1977 | Nagaoka | 358/128 |
| 4,080,625 | 3/1978 | Kawamoto et al. | 358/128 |
| 4,162,510 | 7/1979 | Keizer | 358/128 |
| 4,208,671 | 1/1980 | Ozawa et al. | 360/19 |
| 4,213,148 | 7/1980 | Clemens | 360/77 |
| 4,296,371 | 10/1981 | Keizer et al. | 369/55 |

*Primary Examiner*—Steven L. Stephan
*Attorney, Agent, or Firm*—Birgit E. Morris; Joseph D. Lazar

[57] ABSTRACT

A test disc record suitable for use in testing a capacitive playback stylus, which includes a stylus shoe which contacts a capacitive information disc record during playback and a stylus electrode which is used to recover information recorded in the capacitive information disc record by means of capacitance variations between the capacitive information disc record and the stylus electrode, wherein the test disc record includes in a major surface a continuous spiral groove which comprises an arrangement of a plurality of spiral groove turns wherein the width of a first spiral groove turn or portion thereof and signal information which can be read out by capacitance means contained in a second spiral groove turn or portion thereof which is contiguous with the first spiral groove turn or portion thereof may be used to test the width of the stylus electrode.

A method and an apparatus for testing the capacitive playback stylus which employs the test disc record.

19 Claims, 18 Drawing Figures

METHOD AND APPARATUS FOR TESTING STYLI

This invention relates to a test disc record, and an apparatus and method for testing a capacitive video disc playback stylus.

BACKGROUND OF THE INVENTION

Clemens, in U.S. Pat. Nos. 3,842,194, 3,842,217 and 3,909,517, discloses an information recording and playback system which utilizes variable capacitance. In one configuration of the Clemens system, information representative of recorded picture and sound is encoded in the form of a relief pattern in a relatively fine spiral groove on the surface of a disc record. The disc record is overcoated with a conductive layer followed by a dielectric layer and then a lubricant layer. For example, groove widths of about 2.6 micrometers and groove depths of about 0.5 micrometer may be used. During playback a pickup stylus tip about 2.0 micrometers wide having a thin conductive electrode thereon, for example, about 0.2 micrometer thick, engages the groove as the record is rotated on a supportive turntable. Capacitive variations between the stylus electrode and the record surface are sensed to recover the pre-recorded information.

In a different capacitive information disc record structure, the disc record is grooveless. Signals recorded in the disc record are used to keep the playback stylus properly positioned.

Recent developments have resulted in the use of a conductive disc record substrate which eliminates the need for conductive and dielectric layers. This substrate may be used with either grooved or nongrooved structures.

Kiezer, in U.S. Pat. No. 4,162,510, discloses a playback stylus which may be used with a grooved capacitive video disc record. The stylus is keel-tipped and comprises a dielectric support element having a constricted terminal portion and shoulders interconnecting the body with a constricted terminal portion. The constricted terminal portion is defined by a prow, a substantially flat rear surface remote from said prow, side surfaces extending from the side edges of the rear surface, a bottom extending from the bottom edge of the rear surface and a plurality of additional surfaces extending from the prow and intersecting the bottom and side surfaces. The maximum separation between the substantially parallel side surfaces is the given groove width.

Leedom et al., in a co-pending application entitled, "CONFORMAL VIDEO DISC STYLUS", Ser. No. 158,943, filed June 10, 1980, disclose an improved method for fabricating a playback video disc stylus for use with a non-trapezoidal spiral-grooved information disc record. The method includes preparing a conductive layer on a surface of the dielectric support element, shaping the dielectric support element so that the conductive layer is remote from the prow, and conformally lapping the bottom surface of the stylus with an abrasive silicon oxide layer so that the bottom surface conforms to the groove shape of the information record.

A problem which occurs in the manufacture of a capacitive video disc stylus is determining the width of the bottom surface of the stylus. If the width of the bottom surface is greater than the groove width, the stylus may pick up signals from adjacent spiral groove turns. These extraneous signals result in noticeably poorer video and audio quality. If the width of the bottom surface is too small, the signal-to-noise ratio of the video and audio signals may be significantly reduced.

Measurement of the width of the stylus is difficult since the desired stylus width is generally about 2 micrometers and the desired accuracy of measurement is within a range of better than ±0.2 micrometer. The use of a microscope is time consuming and thus, not cost effective for large scale production. It is therefore desirable to have an improved method to determine the width of the bottom surface of these styli.

SUMMARY OF THE INVENTION

I have found a test disc record suitable for use in testing a capacitive playback stylus, which includes a stylus shoe which contacts a capacitive information disc record during playback and a stylus electrode which is used to recover information recorded in the capacitive information disc record by means of capacitance variations between the capacitive information disc record and the stylus electrode. The test disc record includes, in a major surface, a continuous spiral groove which comprises an arrangement of a plurality of spiral groove turns wherein the width of a first spiral groove turn or portion thereof and signal information, which can be read out by capacitance means, contained in a second spiral groove turn or portion thereof which is contiguous with the first spiral groove turn or portion thereof may be used to test the width of the stylus electrode. By relating the stylus shoe width to the electrode width, the shoe width can be determined.

I have also found a test apparatus for testing a capacitive playback stylus which employs the test disc record and a method for testing a capacitive playback stylus which includes the use of the test disc record.

DETAILED DESCRIPTION OF THE INVENTION

In the present invention a combination of groove width and recorded information in a grooved capacitive information disc record are employed to determine the electrode width of a capacitive playback stylus. If the electrode of a capacitive playback stylus is wider than a spiral groove turn in which the stylus shoe is located, and therefore overlaps a contiguous spiral groove turn, it can pick up information recorded in the contiguous spiral groove turn. By having spiral groove turns of known width wherein the stylus shoe is located, the width of the electrode can be determined.

The asymmetry of a stylus electrode may also be determined in accordance with the present invention. The detected asymmetry of the stylus electrode may be used to adjust the stylus side bias force to correct the asymmetry. For example, see Taylor et al., U.S. Pat. No. 4,030,123.

Figure 1:
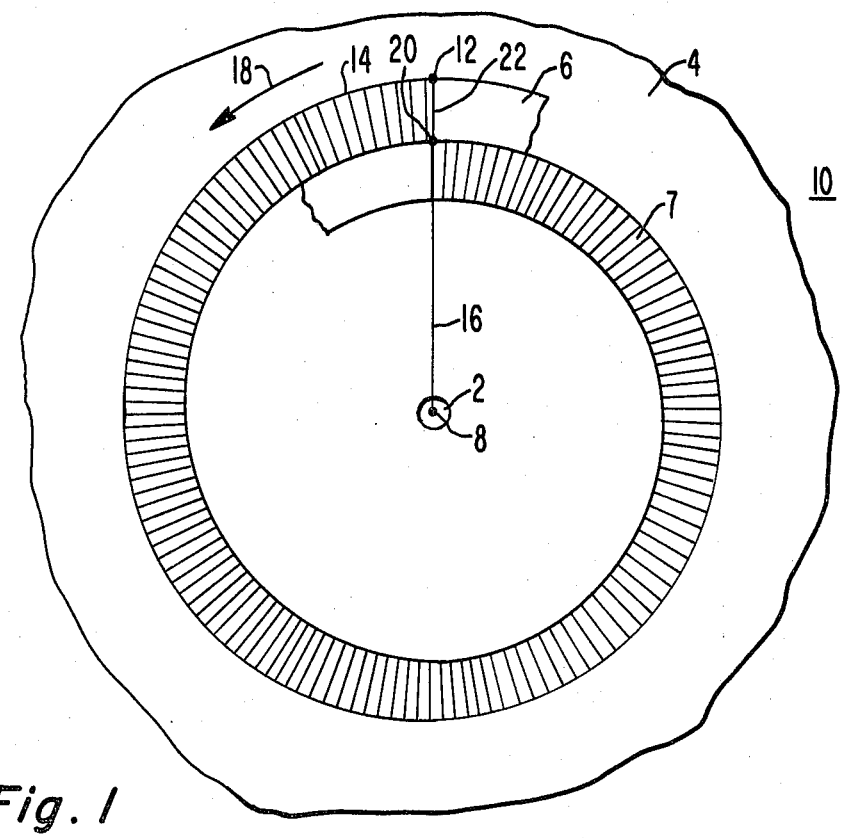
FIG. 1 is a schematic top view of a test disc record of the instant invention.

The present invention will be further described with the aid of the Drawing. FIG. 1 is a schematic top view of a test disc record 10. The test disc record 10 has a center hole 2 which is used for insertion over a turntable spindle, not shown. In a test disc record major surface 4, a continuous spiral groove 6 is present.

A spiral groove turn 7 is defined by one rotation of the continuous spiral groove 6 about the disc record center 8. Thus, a first point 12 on top of spiral groove wall 14 has a radial distance defined by a line 16 which is connected to the disc record center 8. The inward-going direction of rotation of the continuous spiral groove 6 is shown by a curved arrow 18. For one spiral groove turn 7, the first point 12 is rotated along the spiral groove wall 14 until the first point 12 again crosses the line 16 at a second point 20. The rotation of the first point 12 to the second point 20 is one spiral groove turn 7. The groove width 22 is the distance between the first point 12 and the second point 20 along the line 16.

Figure 2:
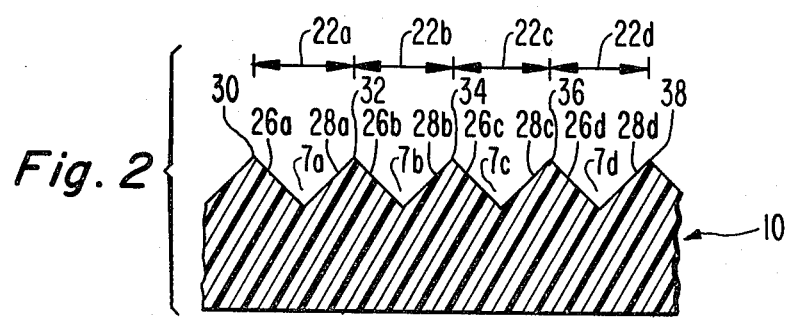
FIG. 2 is a schematic cutaway transverse view of a test disc record.

FIG. 2 is a schematic cutaway transverse view of a number of spiral groove turns 7 a–d of a test disc record 10. The test disc record 10 shown is prepared from a conductive molding composition and therefore does not require conductive and dielectric layers. It is to be understood that other capacitive disc record structures such as the aforementioned coated structure of Clemens may also be suitable.

A "V"-shaped continuous spiral groove 6 is shown although other shapes may also be employed. Each spiral groove turn 7 a–d is defined by a first wall 26 a–d, respectively, and a second wall 28 a–d, respectively. The contiguous spiral groove turns are separated from each other by a first land 30, a second land 32, a third land 34, a fourth land 36, and a fifth land 38. The spiral groove width 22 a–d is defined by the intersection of the first walls 26 a–d, respectively, and the second wall 28 a–d, respectively, with the lands 30, 32, 34, 36, and 38, respectively.

The electrode of a stylus, not shown, whose shoe is present in a spiral groove turn, for example, a second spiral groove turn 7b, can sense the signal recorded in contiguous spiral groove turns, for example, a first spiral groove turn 7a and a third spiral groove turn 7c, if the electrode is wider than the second spiral groove turn 7b and the second land 32 or the third land 34.

Figure 3:
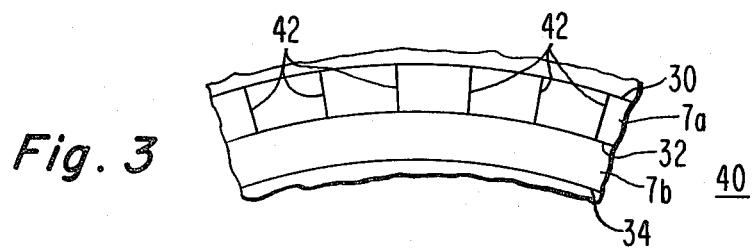
FIG. 3 is a schematic top view of a portion of a test disc record showing a first spiral groove turn arrangement.

FIG. 3 is a schematic top view of a portion of a test disc record 10 showing portions of a first spiral groove turn arrangement 40 comprising two contiguous spiral groove turns 7a and 7b of the continuous spiral groove 6. In the first spiral groove turn 7a, signal information of a first frequency which can be read out by capacitive means is recorded as first signal elements 42. By varying the width of the second spiral groove turn 7b or the second land 32, the width of a stylus electrode can be determined.

Figure 4:
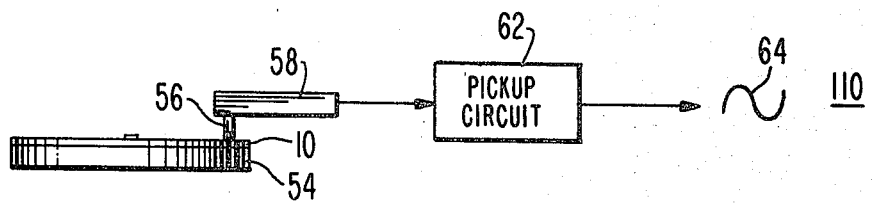
FIG. 4 is a schematic representation of a test apparatus of the present invention.

FIG. 4 is a schematic representation of a test apparatus 110 for determining the width of a stylus electrode. The apparatus includes the test disc record 10, a turntable 54 for rotatably supporting the test disc record 10 and a carriage, not shown, which is subject to translation in synchronization with the radial motion of the stylus 56 during playback and which includes a conductive arm housing. The carriage may have a compartment for removably receiving a cartridge 58, such as that described by Allen, U.S. Pat. No. 4,030,124, which houses a signal pickup assembly. Present in the cartridge 58 is the stylus 56 which is to be tested. A flylead, a thin, conductive leaf spring connects the stylus electrode to the cartridge 58 as described in Dholakia, U.S. Pat. No. 4,077,050. See Clemens, U.S. Pat. No. 4,213,148 for a description of a video disc player which may be adapted for use in the present invention.

A pickup printed circuit 62 such as that disclosed in Kawamoto et al., U.S. Pat. No. 4,080,625, and incorporated herein by reference, may be employed which is responsive to the signal pickup output and develops at its output terminal a recovered signal 64 representative of the recorded information.

As signal-representative geometric variations in the bottom of the continuous spiral groove pass beneath the stylus electrode, they cause variations in the capacitance exhibited between the stylus electrode and the test disc record 10. The variable capacitance loads one end of a transmission line formed by the serially connected flylead and a printed circuit conductor with the housing. The opposite end of the transmission line is loaded by the series combination of a capacitor and a varactor diode.

In the signal pickup operation the stylus-record capacitance variations cause variations in the tuning of a resonant circuit formed by the transmission line and its end loading capacitances. UHF oscillations, applied to the first conductor via an input lead are coupled to the tuned circuit via inductive coupling between two printed circuit conductors. The location of the tuning variation range is centered at a frequency slightly shifted from the UHF source frequency, so that the source frequency falls on a slope of the resonance curve of the tuned circuit, and effectively moves up and down said slope as the stylus-record capacitance varies. Another conductor with relatively tight inductive coupling to the transmission line first conductor is energized with UHF oscillations of an amplitude which varies significantly with the slope position of the source frequency. Such amplitude modulation of the UHF oscillations is detected by the operation of a detector diode to recover the recorded signal information.

The recovered signal 64 may be further processed by amplification or by use of an appropriate bandpass filter so that a signal component corresponding to one or more frequencies may be separated from the recovered signal 64.

Figure 5:
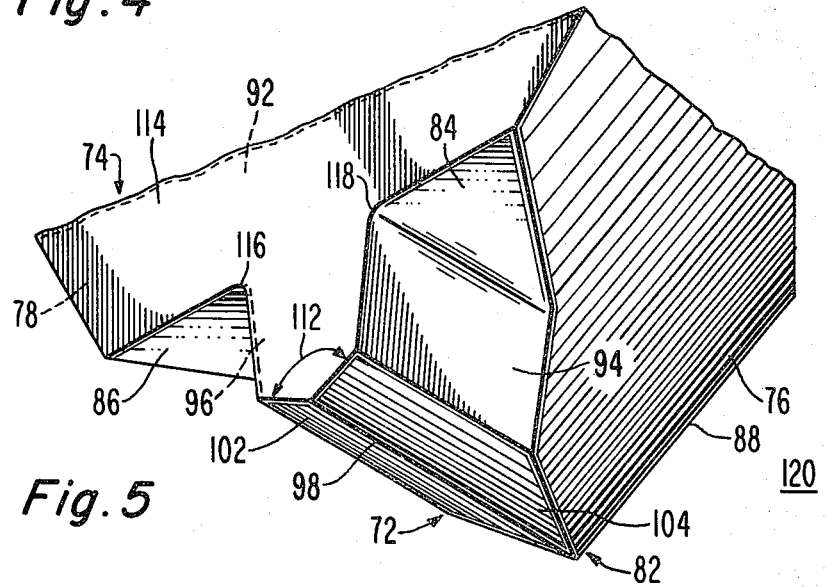
FIGS. 5 and 6 are perspective views of a keel-tipped capacitive playback stylus.
Figure 6:
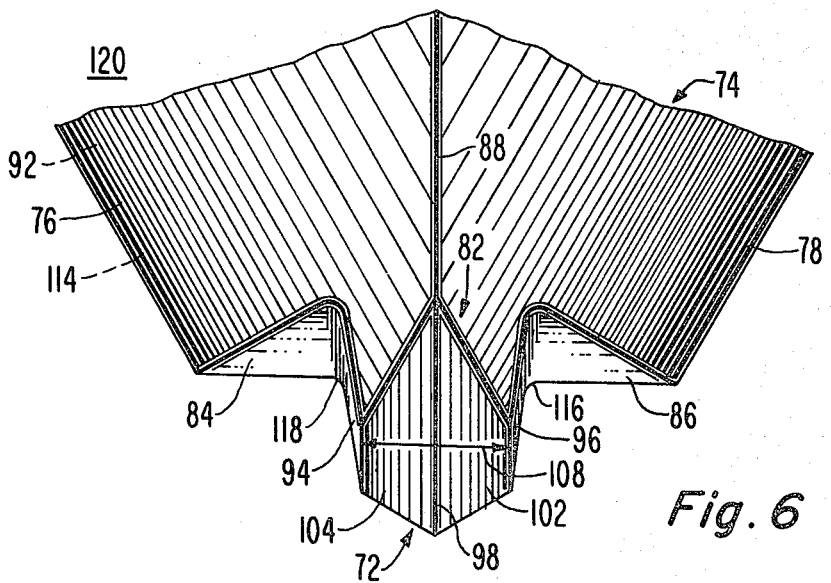

FIGS. 5 and 6 are perspective views of a keel-tipped stylus 120 whose bottom surface 72 is "V"-shaped. It is to be understood, however, that the present invention is not limited to a stylus of any particular shape or material. Furthermore, this invention is not limited to a stylus which is to be used with a grooved capacitance information disc record, but is applicable to any playback stylus having the properties discussed herein.

Nagaoka, U.S. Pat. No. 4,037,253 has disclosed a pressure sensitive pickup device which employs a piezoelectric component. The shoe width of such a device may be determined using a modification of the present invention. Instead of employing capacitive readout of information recorded in a contiguous spiral groove turn, other means such a piezoelectric or piezoresistive readout of the information could be employed.

The keel-tipped stylus 120 includes a dielectric support element 74 having bevelled surfaces 76 and 78, a constricted terminal portion 82 and shoulders 84 and 86 joining the bevelled surfaces 76 and 78, respectively, to the constricted terminal portion 82. The constricted terminal portion 82 is defined by a prow 88, a substantially flat rear surface 92 remote from the prow 88, a pair of substantially parallel side surfaces 94 and 96 extending from the side edges of the rear surface 92 and a bottom surface 72. The stylus bottom surface 72 comprises a bottom edge 98 which rides along the apex of the groove and a first face 102 and a second face 104 which define the "V"-shape. An imaginary line 108 is perpendicular to the bottom edge 98, transverse to the groove and measures the width of the bottom surface 72. The width of the bottom surface 72 along the imaginary line 108 should not be greater than the groove width. A typical value for the bottom surface 72 width as measured by the imaginary line 108 is about 1.8 to 2.2 micrometers for a groove about 2.6 micrometers wide. The angle 112 which the first face 102 makes with the second face 104 at the bottom edge 98 preferably corresponds to that of the groove, typically about 138 to 142 degrees, preferably about 140 degrees. The length of the bottom edge 108 is typically about 4–6 micrometers, preferably about 5 micrometers. An electrode 114, which covers the rear surface 92, may be a conducting layer about 1500–2000 angstroms thick. Metals such as titanium, hafnium, tantalum, and the like, may be used as the conducting layer.

The concave junctions 116 and 118 are present at the intersections of the side faces 94 and 96, respectively, with the shoulders 84 and 86, respectively.

By playing styli such as the keel-tipped stylus 120 shown in FIGS. 5 and 6 on the test disc records 10 of the type shown in FIGS. 1–3, it is possible to determine whether or not the stylus electrode width and, hence, the stylus bottom surface 72 width or "shoe" width is within tolerance. It is also possible to automate the testing of the shoe width so that it may be done quickly and reproducibly at low costs.

In recording test disc records 10 such as those shown in FIGS. 1–3, the same groove shape used for programmed capacitive information disc records can be used. A carrier signal, such as the first frequency and the second frequency as first signal elements 42 and second signal elements 44, respectively, as shown in FIGS. 3 & 7 through 12 in the range of from about 0.1 to about 10 megahertz (MHz), more preferably in the 0.5 to 5 MHz range, may be recorded in one or more spiral groove turns. The intervening spiral groove turns, e.g., the second spiral groove turn 7b of FIG. 3, may be left blank or "silent". Alternatively, a silent spiral groove turn signal may be used for calibration or orientation purposes such as for the determination of the position of the stylus shoe 72 in the continuous spiral groove 6.

For a stylus 120 of the keel-tipped variety shown in FIGS. 5 and 6, a minimum shoe width of about 1.8 micrometers and a maximum shoe width of 2.2 micrometers is currently preferred. Thus, one section of the test disc record 10 would have a spiral groove width 22 a–d of about 1.8 micrometers and another section of the test disc record 10 would have a spiral groove width 22 a–d of about 2.2 micrometers. Test disc records 10 may be pressed from master recordings prepared by any convenient means such as by electromechanical, electron beam or optical methods in the same manner as capacitive information disc records including employing conductive molding compositions.

In testing a stylus on a test disc record, the styus will play sequentially through a spiral groove turn with signal information of a given frequency and one or more spiral groove turns without such signal information, i.e., one or more of the "silent" spiral groove turns. If the stylus electrode width is less than the width of the slient spiral groove turn, relatively little signal information from the contiguous spiral groove turn will be retrieved during playback of a silent spiral groove turn. If the stylus electrode width is greater than the width of the silent spiral groove turn, the electrode will sense signal information from the contiguous spiral groove turns. The amplitude of the contiguous spiral groove turn signal information can be calibrated relative to the first amplitude recovered during playback of the signal-containing spiral groove turn as well as to the second amplitude recovered during playback of a spiral groove turn not contiguous to a spiral groove turn containing signal information. These amplitudes can be used to indicate whether or not the stylus electrode is wider than the silent spiral groove turn.

Figure 7:
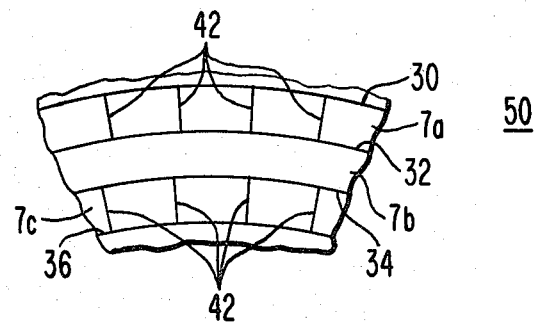
FIG. 7 is a schematic top view of a portion of a test disc record showing a second spiral groove turn arrangement.

FIG. 7 is a schematic top view of a portion of a test disc record 10 showing portions of a second spiral groove turn arrangement 50 comprising three sequentially contiguous spiral groove turns 7 a–c of the continuous spiral groove 6. Both the first spiral groove turn 7a and the third spiral groove turn 7c contain signal information of the first frequency as first signal elements 42.

In actual practice the stylus shoe and the associated electrode tip may be asymmetrically shaped or may track asymmetrically with respect to the slient spiral groove turn. Thus, one edge of the electrode may approach or overlap one contiguous spiral groove turn while the other edge does not overlap a second contiguous spiral groove turn. The third spiral groove turn arrangement 60 as shown in FIG. 8 may be used to determine this asymmetry.

Figure 8:
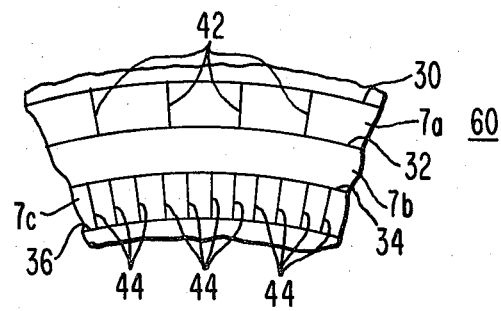
FIG. 8 is a schematic top view of a portion of a test disc record showing a third spiral groove turn arrangement.

FIG. 8 is a schematic top view of a portion of a test disc record 10 showing portions of a third spiral groove turn arrangement 60 comprising three sequentially contiguous spiral groove turns 7a, 7b, and 7c of the continuous spiral groove 6. The first spiral groove turn 7a and the second spiral groove turn 7b are the same and are similarly disposed as shown in FIGS. 3 and 7. In the third spiral groove turn 7c signal information of a second frequency which can be read out by capacitive means is recorded as second signal elements 44.

An analysis of the results obtained when the third spiral groove turn arrangement 60 is used with a keel-tipped stylus 120 having a shoe width 108 specification of from 1.8 to 2.2 micrometers is shown in the table below when the thickness of the lands 30, 32, 34, and 36 are small compared to the groove widths 22 a–d.

TABLE

| Test Disc Record Spiral Groove Width (Micrometers) | Pass Conditions During Playback of Silent Spiral Groove Turn | Fail Conditions During Playback of Silent Spiral Groove Turn |
| --- | --- | --- |
| 1.7 | First frequency and second frequency signal information recovered. | Nothing, or first frequency signal information only or second frequency signal information only is recovered. |
| 2.3 | Nothing recovered. | First frequency information signal only or second frequency information signal only or both information signal frequencies are recovered. |

For the 1.7 micrometer silent second spiral groove turn 7b, if the stylus shoe width 108 is within specification, signals from the two contiguous spiral groove turns 7a and 7c will be recovered. In the fail condition either the stylus shoe width 108 is too narrow, in which case no information signal will be recovered, or the stylus is asymmetrical, so that only the information signal from one of the two contiguous spiral groove turns 7a and 7c is recovered.

When the slient spiral groove turn 7b width is 2.3 micrometers, in the pass condition, no signal will be recovered since the stylus electrode width 108 will be narrower than the silent spiral groove turn 7b. In the fail condition, only one signal is recovered if the stylus electrode is asymmetrical so that it overlaps only one of the two contiguous spiral groove turns 7a and 7c. However, both the first frequency and second frequency information carrier signals 42 and 44, respectively, are recovered if the stylus electrode is too wide yet symmetrical enough so that the shoe 72 overlaps both contiguous spiral groove turns 7a and 7c. The test apparatus 140 shown in FIG. 4 may be employed to obtain the recovered signal 96 which can be amplified and filtered to determine the first frequency and second frequency signal information components. A number of sections in the test disc record with different spiral groove turn widths may be made by varying the groove pitch during recording.

The spiral groove turn arrangements 70, 80, 90, and 100 shown in FIGS. 9 through 12, respectively, illustrate embodiments of the present invention wherein the arrangement of the spiral groove turns allows for the determination of the position of the stylus shoe 72.

Figure 9:
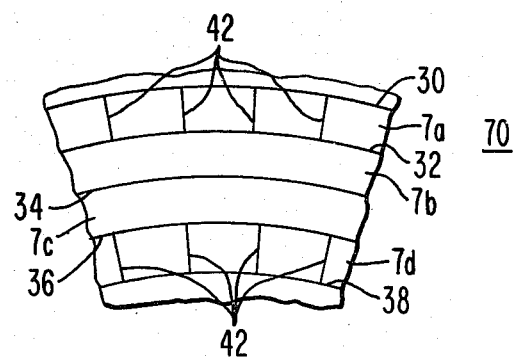
FIG. 9 is a schematic top view of a portion of a test disc record showing a fourth spiral groove turn arrangement.

FIG. 9 is a schematic top view of a portion of a test disc record 10 showing portions of a fourth spiral groove turn arrangement 70 comprising four sequentially contiguous spiral groove turns 7 a–d of the continuous spiral groove 6. The first spiral groove turn 7a and the second spiral groove turn 7b are the same and are similarly disposed as shown in FIG. 3. Contiguous with the second spiral groove turn 7b is the silent third spiral groove turn 7c. Contiguous with the third spiral groove turn 7c is the fourth spiral groove turn 7d. In the fourth spiral groove turn 7d signal information of the first frequency is recorded as first signal elements 42.

Thus, for the fourth spiral groove turn arrangement 70, the presence of two contiguous silent spiral groove turns 7b and 7c allows for the ready determination of the position of the stylus shoe 72. In this manner, the asymmetry of the stylus electrode may be determined by comparing the signal information recovered 64 from first spiral groove turn 7a when the stylus is present in the second spiral groove turn 7b with the signal information recovered 64 from the fourth spiral groove turn 7d when the stylus is in the third spiral groove turn 7c. The presence of the two contiguous silent groove turns 7b and 7c is determinative of the relative position of the stylus shoe 72 in the continuous spiral groove 6.

Figure 10:
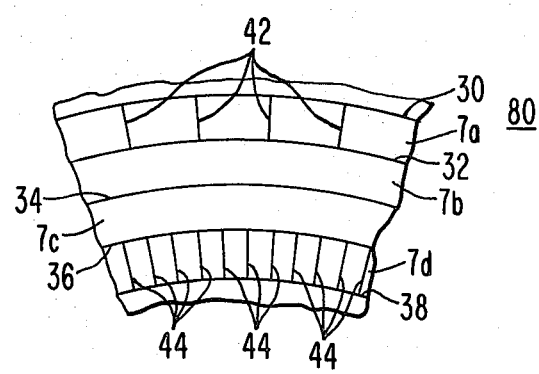
FIG. 10 is a schematic top view of a portion of a test disc record showing a fifth spiral groove turn arrangement.

The fifth spiral groove turn arrangement 80, shown in FIG. 10, varies from that shown in FIG. 9 in that the fourth spiral groove turn 7d comprises signal information of the second frequency. Again, in this spiral groove turn arrangement, the presence of the two silent grooves 7b and 7c allow for the determination of the relative position of the stylus shoe 72 so that the asymmetry of the stylus electrode 114 may be determined.

Figure 11:
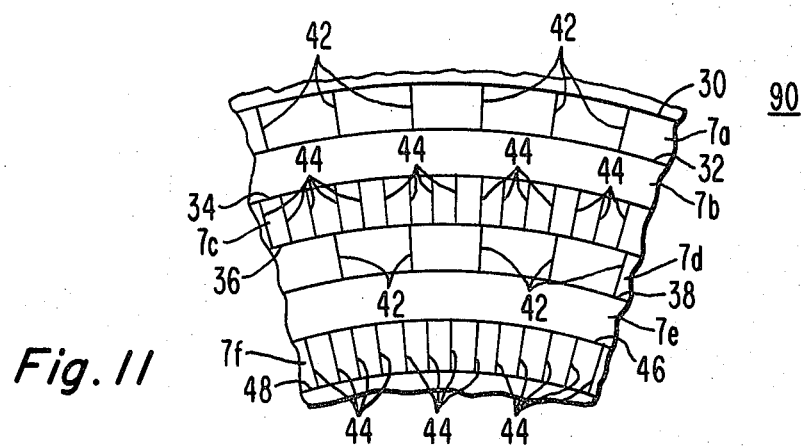
FIG. 11 is a schematic top view of a portion of a test disc record showing a sixth spiral groove turn arrangement.

FIG. 11 is a schematic top view of a portion of a test disc record 10 showing a sixth spiral groove turn arrangement 90 comprising six sequentially contiguous spiral groove turns 7 a–f of the continuous spiral groove 6. The arrangement of the first spiral groove turn 7a, the second spiral groove turn 7b and the third spiral groove turn 7c are the same and are similarly disposed as shown in FIG. 8. Contiguous with the third spiral groove turn 7c is the fourth spiral groove turn 7d in which signal information of the first frequency is recorded as first signal element 42. Contiguous with the fourth spiral groove turn 7d is a silent fifth spiral groove turn 7e bordered by the fifth land 38 and a sixth land 46. Contiguous with the fifth spiral groove turn 7e is a sixth spiral groove turn 56, bordered by the sixth land 46 and a seventh land 48. In the sixth spiral groove turn 7f, signal information of the second frequency is recorded as second signal elements 44.

The sixth spiral groove turn arrangement 90 also allows for determining the relative position of the stylus shoe 72 merely by monitoring the signal recovered 64. The spiral groove turn arrangement of signal information comprising the first frequency, silent groove, signal information comprising the second frequency, which is then repeated, allows for the determination of the relative position of the stylus shoe 72 by noting the intensity of the recovered signal 64 as well as its frequency. The use of two band-pass filters to determine both the recovered signal first frequency component and second frequency component is useful in such an arrangement.

Figure 12:
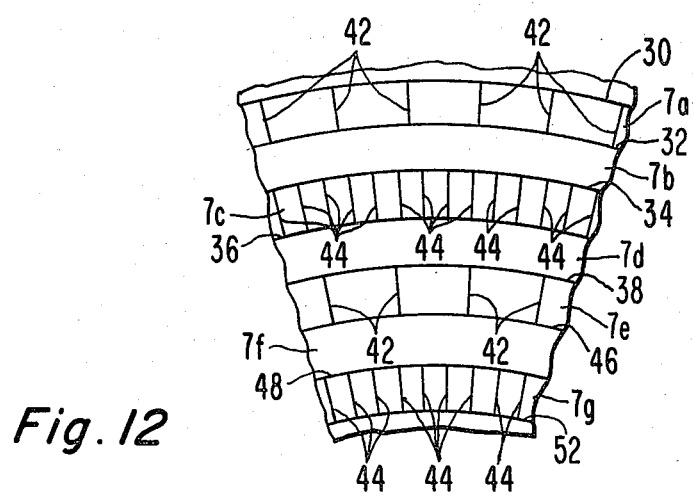
FIG. 12 is a schematic top view of a portion of a test disc record showing a seventh spiral groove turn arrangement.

FIG. 12 is a schematic top view of a portion of a test disc record 10 showing a seventh spiral groove turn arrangement 100 comprising seven sequentially contiguous spiral groove turns 7 a–g of the continuous spiral groove 6. The first spiral groove turns 7a, the second spiral groove turn 7b and the third spiral groove turn 7c are the same and are arranged as shown in FIG. 8. Contiguous with the third spiral groove turn 7c is the silent fourth spiral groove turn 7d. Contiguous with the fourth spiral groove turn 7d is the fifth spiral groove turn 7e. In the fifth spiral groove turn 7e signal information of the first frequency is recorded as the first signal elements 42. Contiguous with the fifth spiral groove turn 7e is the silent sixth spiral groove turn 7f. Contiguous with the sixth spiral groove turn 7f is the seventh spiral groove turn 7g which is bordered by the seventh land 48 and an eighth land 52. In the seventh spiral groove turn 7g signal information of the second frequency is recorded as second signal elements 44.

The seventh spiral groove turn arrangement 100 is yet another way of determining the asymmetry of the stylus electrode 114. In this arrangement, a spiral groove turn containing signal information comprising the first frequency is followed by a silent spiral groove turn which in turn is followed by a spiral groove turn containing information comprising the second frequency. The order of the spiral groove turns is then repeated. Thus, for example, if the stylus shoe 72 is on a spiral groove turn containing signal information of the first frequency, it is known that the next spiral groove turn will be silent. This allows for the determination of the asymmetry of the stylus electrode 114 by monitoring the first frequency and the second frequency during playing of the silent spiral groove turn. Alternatively, it the stylus 120 is on a spiral groove turn containing signal information comprising the second frequency, one knows that the next silent grove turn will be bracketed by one spiral groove turn containing signal information comprising the second frequency and by one spiral groove turn containing signal information comprising the first frequency. Again, this allows for the ready determination of the asymmetry of the stylus electrode 114 by determining the amplitude of the first frequency and the second frequency from the recovered signal 64.

Although the discussion of this invention has been directed to a certain orientation of spiral groove turns containing information and those which are silent, other orientations such as the inversion of the order of the spiral groove turns is also contemplated. Furthermore, although the discussion has focused on complete spiral groove turns, it is to be understood that portions of spiral groove turns may also be employed so long as the portions are large enough so that the desired information may be recovered.

In the event the test disc records are made abrasive, for example, by depositing an abrasive coating or by using a test disc record without a lubricant layer, the disc record could be used for the "V" lapping of styli as discussed in the previously mentioned copending application of Leedom et al. Also, the test disc record containing an abrasive layer in which appropriate signal information is present could be used to monitor the "V" lapping step while it is in progress. A preferred abrasive layer is $SiO_x$ glow discharge deposited from $SiH_4$ and $N_2O$ as disclosed in the copending application of Kaganowicz, "METHOD FOR PREPARING AN ABRASIVE COATING", Ser. No. 963,819, filed Nov. 27, 1978.

Example

A conductive test disc record was prepared in which a pulsed test signal comprising 5 MHz and 716.6 kilohertz (KHz) carrier bands, eight fields per spiral groove turn, was recorded in a first spiral groove turn 7a. The next three contiguous spiral groove turns 7 b-d were silent. This pattern was repeated throughout the continuous spiral groove. The width of the continuous spiral groove was 2.67 micrometers. The lands between spiral groove turns were the intersection points of the spiral groove turn walls.

A modified test apparatus described in Clemens, U.S. Pat. No. 4,213,148 was employed. The 716.6 KHz output signal amplitude was analyzed using a Hewlett Packard H-3585A spectrum analyzer.

Six keel-tipped styli were tested. Their shoe widths were independently determined by scanning electron microscopy as shown in Table II.

TABLE II

| Stylus | Shoe Width (micrometers) |
|---|---|
| A | 2.89 |
| B | 2.59 |
| C | 2.39 |
| D | 2.78 |
| E | 2.27 (asymmetric, long side 1.38 micrometers) |
| F | 2.19 |

A trace of time in seconds vs. relative amplitude in decibels (dB) are shown in FIGS. 13 a–f which corresponds to styli A–F, respectively. The test disc record was rotated at 450 revolutions per minute which corresponds to 0.133 seconds per spiral groove turn. These results indicate that for stylus A the electrode was wide enough to recover signals from an adjacent spiral groove turn containing signal information. The spiral groove arrangement of this Example was advantageous because the center silent groove turn acted as a reference to determine the background noise level.

Figure 13A:
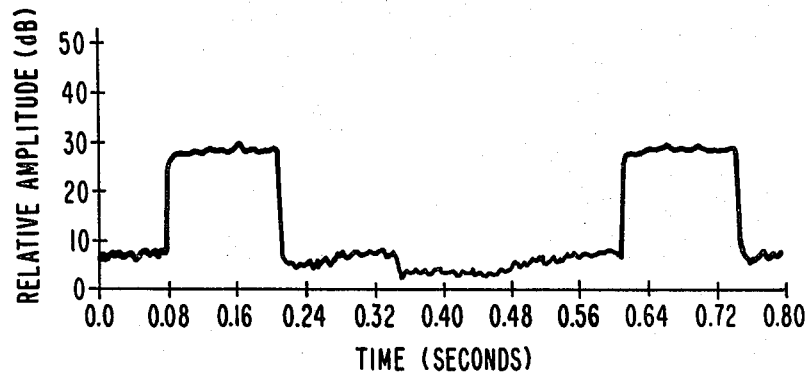
FIGS. 13 a-f are plots of relative amplitude vs. time.
Figure 13B:
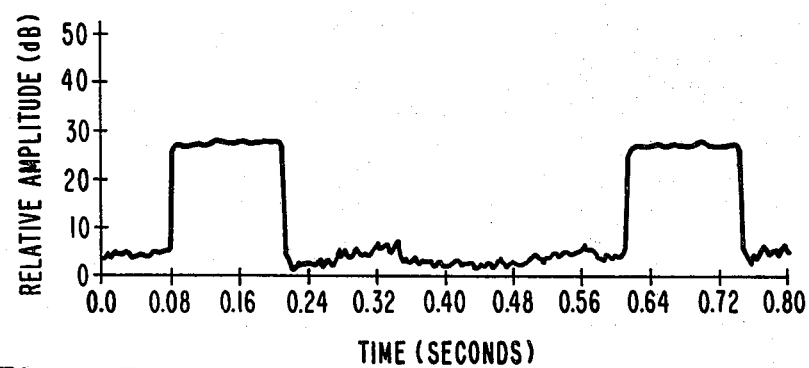
Figure 13C:
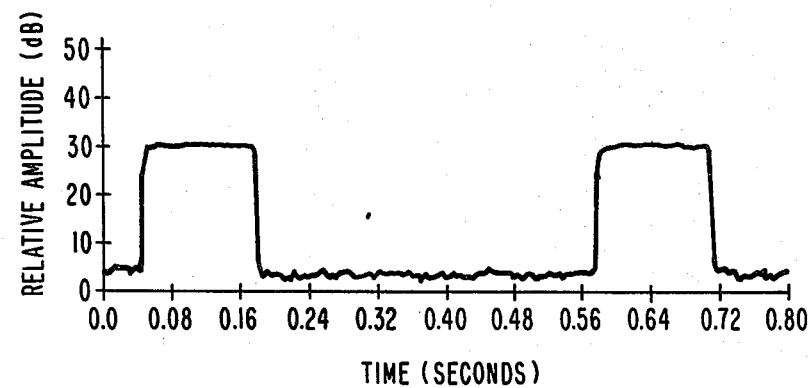
Figure 13D:
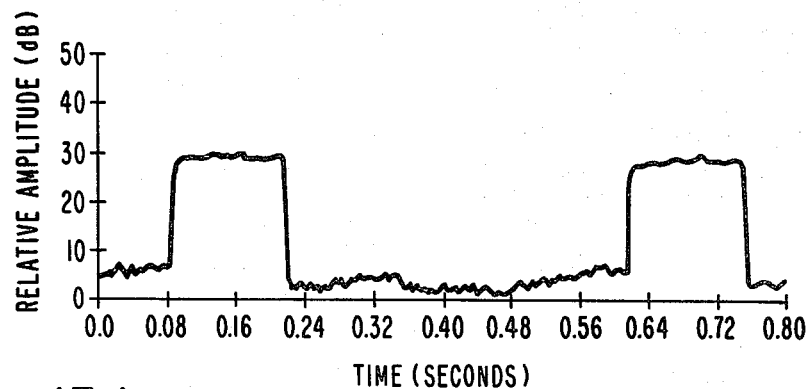
Figure 13E:
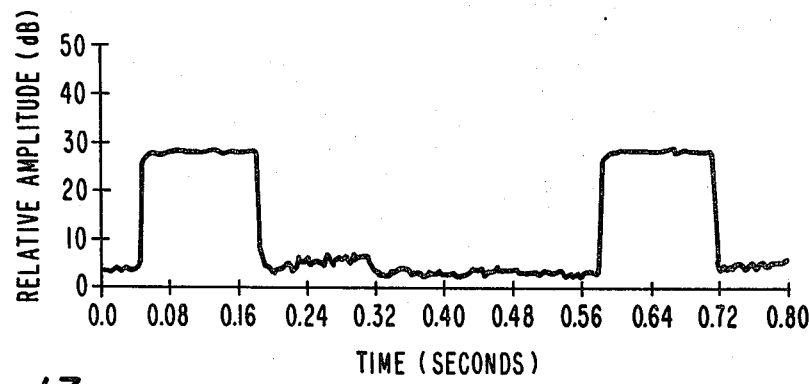
Figure 13F:
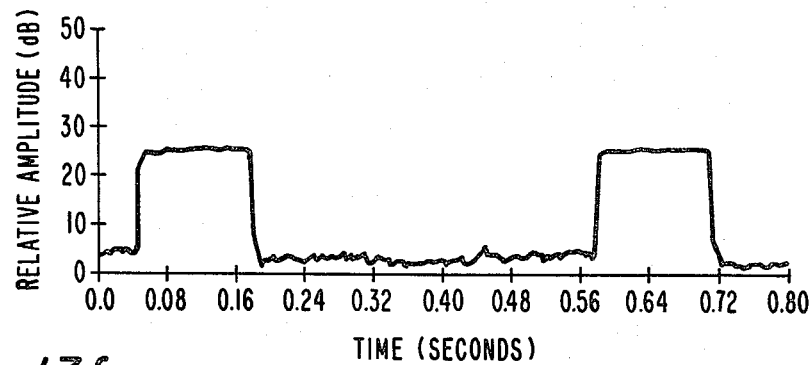

For stylus B (FIG. 13b) there was little signal recovery when the stylus shoe was in the second spiral groove turn 7b or the fourth spiral groove turn 7d with somewhat more recovery for stylus D (FIG. 13d). For styli C and F (FIGS. 13c and f, respectively) there was essentially no recovery from the second or fourth spiral groove turns, 7b and 7d, respectively. For stylus E (FIG. 13e) there was signal recovery only from the outermost second silent spiral groove turn 7b indicating the asymmetry of the stylus electrode.

I claim:

1. A test disc record for testing a capacitive playback stylus, said stylus formed of a stylus shoe which normally contacts a continuous spiral groove of a capacitive information disc record during normal playback and a stylus electrode which is used to recover information recorded in said capacitive information disc record by means of capacitance variations between the capacitive information disc record and the stylus electrode, said stylus electrode adapted to be normally completely within said groove while said shoe is contacting said groove;

said test disc record including in a major surface a continuous spiral adapted to receive said stylus for testing the width or the symmetrical relationship of said electrode in said groove;

said spiral groove further being arranged into m groups or n contiguous turns, each turn of each of said groups having the same predetermined width wherein m and n are integers which have a value, respectively, of at least two;

a test signal recorded in at least one of said turns of each group of turns, said signal having a known amplitude and frequency, whereby relative amplitude information of said signal recovered from each turn by measuring capacitance variations in each turn by said stylus electrode riding in said groove is an indication of the symmetry or width of said stylus electrode relative to said grooves.

2. A test disc record in accordance with claim 1 wherein the continuous spiral groove is coated with an abrasive layer.

3. A test record according to claim 1 wherein n=3 and said test signal is recorded in two of said turns.

4. A test record according to claim 1 wherein n=3 and a second test signal, having a given amplitude and a frequency different from the frequency of said first signal, is recorded in either of the remaining turns of said group of turns.

5. A test record according to claim 1 wherein n=4 and said test signal is recorded in one of the remaining unrecorded turns that is contiguous to the said first recorded signal turn of said group or adjacent group of turns whereby two adjacent turns of each group are not recorded.

6. A test record according to claim 1 wherein n=4 and a second test signal having a given amplitude and a frequency different from the frequency of said first signal is recorded in one of the remaining unrecorded turns that is contiguous to said first recorded signal of said group or adjacent group whereby two adjacent turns of each group are not recorded.

7. A test record according to claim 1 wherein n=6 and a test signal is recorded in the first, third, fourth and sixth turns of each group of turns.

8. A test record according to claims 1, 3, 4, 5, 6 or 7, wherein the width of the grooves in a given group of grooves is different from the grooves in another group whereby the width of the stylus electrode can be determined relative to a particular groove width.

9. A test record according to claims 1, 3, 4, 5 6, or 7 wherein a test signal having a frequency different from said first-mentioned signal is recorded in the other of said grooves.

10. A test apparatus for testing a capacitive playback stylus, which includes a stylus shoe which normally contacts a continuous spiral groove of a capacitive information disc record during playback and a stylus electrode which is used to recover information recorded in the capacitive information disc record by means of capacitance variations between the capacitive information disc record and the stylus electrode, wherein the test apparatus is employed to test the width or the symmetrical relationship of the stylus electrode within said groove and wherein the test apparatus comprises:
 (a) a test disc record which includes a continuous spiral groove arranged in groups of turns in a major surface adapted to receive said stylus for testing the width or the symmetrical relationship of said electrode in said groove;
 (b) a test signal recorded in one of said turns of each group of turns of said record, said signal having a known amplitude and frequency,
whereby relative amplitude information of said signal recovered from each turn by measuring capacitance variations in each turn by said stylus electrode riding in said groove is an indication of the symmetry or width of said stylus electrode relative to said grooves,
 (c) means for contacting the stylus shoe of the stylus to be tested with the continuous spiral groove;
 (d) means for establishing relative motion between the stylus to be tested and the continuous spiral groove;
 (e) means for sensing a capacitive variation between the stylus and a disc record surface while the shoe is contacting the spiral groove and there is relative motion between the stylus and the spiral groove; and
 (f) means for processing the sensed capacitive variations so that the signal representative of the information recorded in the continuous spiral groove may be recovered to provide relative amplitudes of the recovered signals in each group of turns compared to signal amplitudes of adjacent groups.

11. A test apparatus in accordance with claim 10 which additionally comprises processing means for determining the amplitude of a first frequency of the signal information.

12. A test apparatus in accordance with claim 10 wherein the test disc record continuous spiral groove is abrasive.

13. A test apparatus in accordance with claim 12 further comprising means to determine the electrode width while the stylus is being lapped by the abrasive continuous spiral groove.

14. A method for testing a capacitive playback stylus, which includes a stylus shoe which normally contacts a continuous spiral groove in groups of turns of a capacitive information disc record during playback and a stylus electrode which is used to recover information recorded in a capacitive information disc record by means of capacitance variations between the capacitive information disc record and the stylus electrode, in order to determine the stylus electrode width or the symmetrical relationship of the electrode relative to the groove comprising the steps of:
 (a) contacting the stylus shoe with a test disc record wherein the test disc record includes said continuous spiral groove in a major surface adapted to receive said stylus for testing the width or the symmetrical relationship of said electrode in said groove;
 (b) establishing relative motion between the stylus shoe and the test disc record continuous spiral groove;
 (c) sensing the capacitive variations between the stylus electrode and the continuous spiral groove while the shoe is contacting the spiral groove and there is relative motion between the spiral groove and the stylus shoe; and
 (d) processing the sensed capacitive variations so that signals representative of the information recorded in the continuous spiral groove may be recovered to provide relative amplitudes of the recovered signals in each group of turns compared to signal amplitudes of adjacent groups.

15. A method in accordance with claim 14 comprising the additional step of relating the stylus electrode width to the stylus shoe width so that the stylus shoe width may be determined.

16. A method in accordance with claim 15 wherein the electrode width is co-terminus with the stylus width.

17. A method for lapping a capacitive playback stylus, which includes a stylus shoe which normally contacts a continuous spiral groove of a capacitive information disc record during playback and a stylus electrode which is used to recover information recorded in a capacitive information disc record by means of capacitance variations between the capacitive information disc record and the stylus electrode, comprising the steps of:
 (a) recording a test signal in one or more groove turns of a lapping disc record so that the amplitude information recovered from each groove as said stylus rides in the groove compared to the amplitude recovered in adjacent turns is an indication of the symmetry or width of the stylus electrode relative to the groove;

(b) contacting the stylus shoe with said lapping disc record wherein the lapping disc record includes an abrasive, continuous spiral groove, in a major surface, which comprises a plurality of spiral groove turns wherein the width of a first spiral groove turn or portion thereof and the signal information which can be read out by capacitive means contained in a second spiral groove or portion thereof which is contiguous with the first spiral groove turn or portion thereof is used to test the width or symmetrical relative of the stylus electrode within the groove;

(c) establishing relative motion between the stylus and the lapping disc record continuous spiral groove;

(d) sensing the capacitive variations between the stylus electrode and the continuous spiral groove while the stylus is contacting the continuous spiral groove and there is relative motion between the continuous spiral groove and the stylus;

(e) processing the sensed capacitance variations so that a signal representative of the information recorded in the spiral grooving may be recovered; and (f) lapping the stylus in the continuous spiral groove until the recovered signal indicates that the desired lapping results have been obtained.

18. A method in accordance with claim 17 wherein the continuous spiral groove is made abrasive by means of an abrasive layer.

19. A method in accordance with claim 17 comprising the additional step of relating the width of the stylus electrode with the width of the stylus shoe.

* * * * *